United States Patent [19]

Frahm

[11] 4,181,243

[45] Jan. 1, 1980

[54] DEVICE FOR FILTERING BEVERAGES

[76] Inventor: Carl E. Frahm, 1428 Oak Meadow Rd., Arcadia, Calif. 91006

[21] Appl. No.: 889,359

[22] Filed: Mar. 23, 1978

[51] Int. Cl.$^2$ ............................................... B67D 3/00
[52] U.S. Cl. .................... 222/189; 137/550; 210/282
[58] Field of Search ................ 222/189; 137/545, 550; 210/282

[56] References Cited

U.S. PATENT DOCUMENTS

| | | | |
|---|---|---|---|
| 2,091,042 | 8/1937 | Hedges | 222/189 X |
| 2,616,095 | 11/1952 | Stuckey | 222/189 X |
| 2,785,803 | 3/1957 | Young | 210/282 |
| 3,220,555 | 11/1965 | Silha | 210/282 |
| 3,262,570 | 7/1966 | Gailitis et al. | 210/282 X |
| 3,430,769 | 3/1969 | Sanzenbacher | 210/282 X |
| 3,529,726 | 9/1970 | Keenan | 210/282 X |

FOREIGN PATENT DOCUMENTS 393633 11/1965 Switzerland ............................ 222/189

*Primary Examiner*—Charles A. Marmor
*Attorney, Agent, or Firm*—Lyon & Lyon

[57] ABSTRACT

A filter element is provided at the inlet of a spigot for dispensing beverages from a reservoir or cooler. The filter mechanism preferably includes an open, cup-shaped member which is desirably threaded to the inlet shaft of the spigot to act as a fastener for mounting the spigot to the reservoir. The filter element is quickly insertable into and removable from the filter receiving member by a push fit. The preferred filter element includes two apertured end walls, filter paper positioned immediately adjacent the inner faces of each of the apertured end plates, and activated charcoal between the filter paper.

9 Claims, 4 Drawing Figures

DEVICE FOR FILTERING BEVERAGES

The present invention relates generally to filters for use in conjunction with valves of the faucet or spigot type, and particularly to filters for use in devices for withdrawing liquids from beverage containers at relatively low pressures, such as water coolers, wine barrels and the like.

An object of the invention is to provide a novel means for filtering beverages as they are dispensed for consumption.

A further object of the invention is to provide an improved filter mechanism and filter element for use in dispensers of bottled water whereby the filter element is easily insertable in and detached from the remainder of the assembly for quick replacement.

Another object is to provide a filter mechanism which also functions as a fastener for mounting a dispensing valve or spigot to a reservoir.

Yet another object is to provide a novel filter element.

These objects and other objects, features and advantages of the invention will become more apparent as the following detailed description of the preferred embodiment of the invention proceeds with continued continued reference to the drawings in which FIG. 1 is a side elevational view of a water bottle and reservoir assembly partially broken away to show the filter mechanism and valve assembly of the present invention;

DESCRIPTION OF PREFERRED EMDOIMENT

Figure 1:
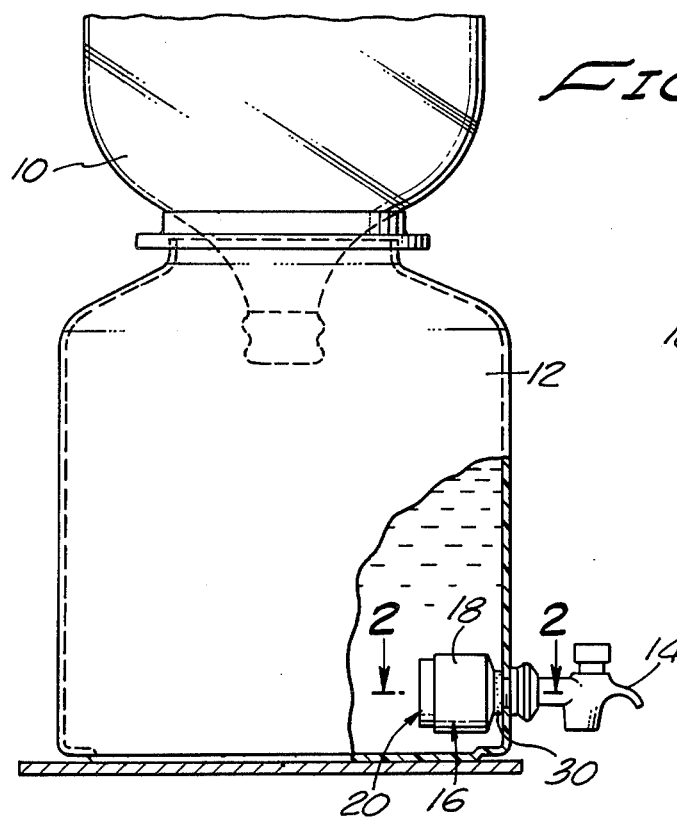

As shown in FIG. 1, inverted water bottle 10 is mounted on reservoir 12 to deposit the water carried by bottle 10 in reservoir or cooler 12, from whence it is dispensed through a valve 14 of the spigot or faucet type. A filter mechanism in accordance with the invention indicated generally at 16 is provided at the inlet of spigot 14 (in the manner to be described below) so that all water dispensed from the reservoir 12 through spigot 14 passes through the filter mechanism 16.

Figure 2:
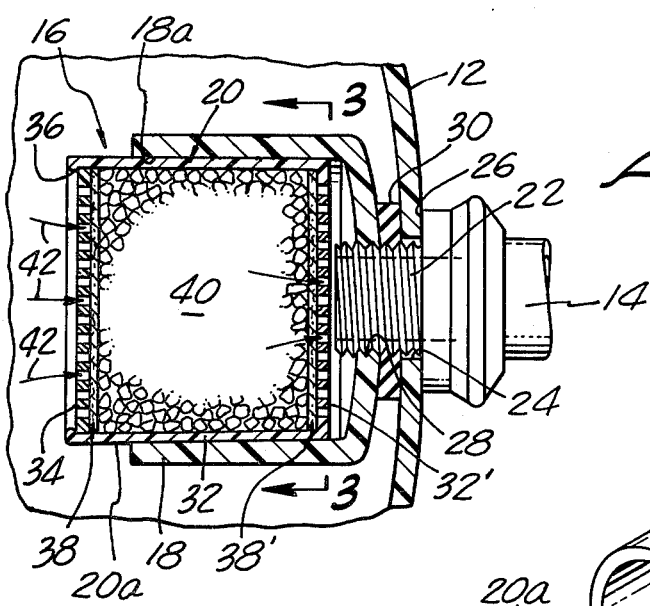
FIG. 2 is a sectional view of the filter mechanism of the invention taken along line 2—2 in FIG. 1.
Figure 4:
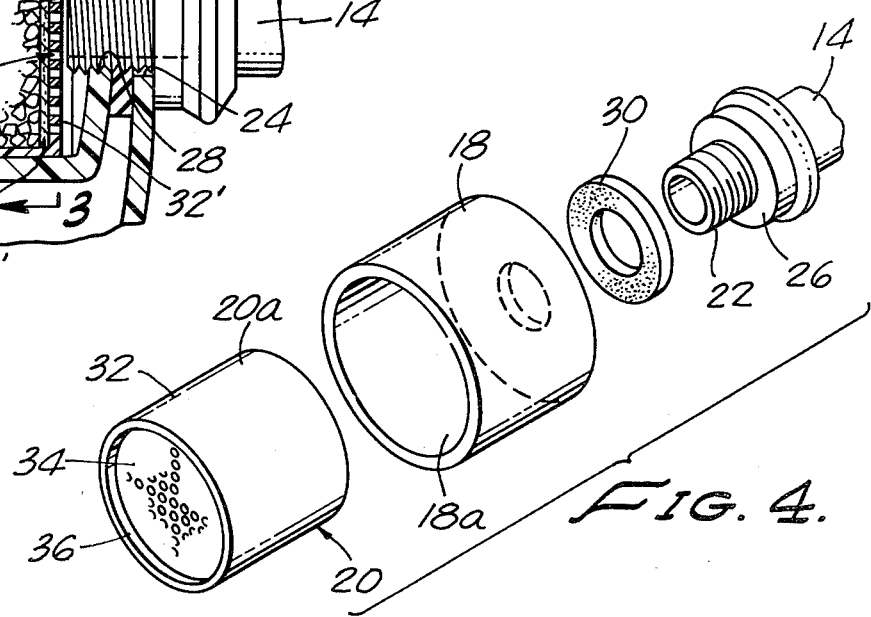
FIG. 4 is an exploded view of the elements of the filter mechanism.

The filter mechanism 16 is shown in greater detail in FIGS. 2 and 4 as comprising generally a filter receiving means 18 and filter element 20. The filter receiving means 18 desirably is an open-ended, cup-shaped member and the filter element 20 can be "push fitted" into the filter receiving means 18. In the preferred embodiment the filter element 20 has a cylindrical configuration which complements the contours of the cup-shaped member 18, but it should be appreciated that a wide variety of complementary configurations will suffice. In addition to complementary configuration, the dimensional size of the opening of filter receiving means 18 is preferably almost identical to the size of the exterior of filter element 20.

Means are preferably provided for holding the elements 18 and 20 snugly together in response to insertion of the filter element 20 into the receiver 18. In the preferred embodiment this is achieved by tapering at least one of the two mating surfaces, the periphery of the filter element 20 and the inner complementary cylindrical (as shown) surface of the receiving means 18. A taper that has been found to be effective is a taper on the order of 1° to the peripheral surface 20a of filter element 20 so that the small diameter end of filter element 20 enters the receiving means 18 easily while the portion of peripheral surface 20a last entering the receiving means 18 fits snugly against the inner surface 18a of the receiving means 18 to hold the filter 20 in place. Thus the filter 20 can be "push fitted" into the receiver by merely pushing it longitudinally into the complementary portion of the receiving means. The filter mechanism is preferably constructed and arranged (as shown) so that the water flow through it tends to urge the elements 18 and 20 together in the direction of the push fit.

The filter mechanism 16 is mounted to the inlet of the water spigot 14 in the following manner. The inlet of the water spigot 14 is defined by the interior of an externally threaded pipe member 22 which passes through hole 24 formed in the reservoir wall. Enlarged shoulder 26 positions the spigot 14 against the exterior wall of the reservoir and the filter receiving means 18 also serves to mount the spigot 14 by virtue of the threaded hole 28 formed in the closed end of cup-shaped member 18 which is adapted to engage the threads on pipe 22. A washer 30 is placed between the filter receiving means 18 and the interior wall of the reservoir 12. The filter mechanism and water spigot assembly may thus be quickly mounted to the reservoir by inserting the pipe 22 through a hole in reservoir 12, the washer 30 placed on the stem of pipe 22, the member 18 screwed onto the pipe 22 to act as a nut to mount the spigot, and the filter element 20 is "push-fitted" into receiving means 18.

Figure 3:
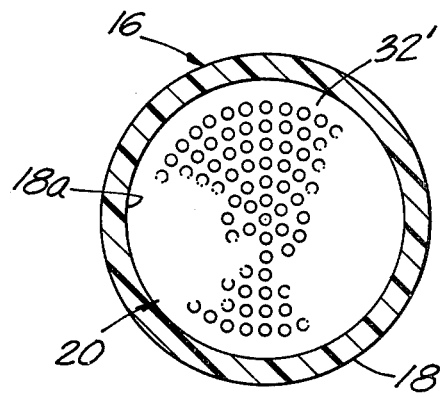
FIG. 3 is a partially sectional view of the filter element end plate in accordance with the invention taken along line 3—3 of FIG. 2.

As shown in FIG. 2, the filter element 20 preferably comprises a cup-shaped member 32, desirably of plastic material, which forms the peripheral wall 20a and one end wall of the element 20. The open end of the member 32 is closed by end plate 34 which is pressed into the element 32 and held in place by bead 36. End walls 34 and 32' (the closed end of the element 32) are apertured preferably with a plurality of relatively small apertures arrayed in a regular or mesh pattern (see FIG. 3). For optimum filtering action, the filter element preferably includes filter paper 38 and 38' adjacent the inside surfaces of apertured end plates 34 and 32', respectively, and the interior of the filter element preferably contains activated charcoal indicated at 40. Thus the dispensed water passes (generally in the direction of the arrows 42 in FIG. 2) through apertured plate 34, filter paper 38, activated charcoal 40, filter paper 38' and apertured plate 32' before it is to be consumed. This direction of flow also urges the filter element 20 and receiving means 18 into a press fit relationship.

It can thus be seen that the invention provides a compact, easily installed and maintained filter mechanism and spigot assembly for dispensing filtered beverages.

The foregoing description of the preferred embodiment of the invention is for illustrative purposes only and not by way of limitation. It should be appreciated that the present invention contemplates all equivalents or modifications thereof which fall within the spirit and scope of the appended claims.

I claim:

1. An apparatus for filtering and dispensing a beverage at essentially atmospheric pressure from a reservoir comprising:

a spigot adapted to be mounted to the reservoir to dispense liquid therefrom, said spigot having a hollow member extending through an opening in the wall of the reservoir and having fastening means at the interior porton of the hollow member for fastening said spigot to said reservoir and an enlarged portion for positioning the spout of the spigot externally of the reservoir;

a filter receiving means adapted to receive a filter element positioned at the entrance of the spigot interior of the reservoir to filter the beverage passing through the spigot, said filter receiving means having fastening means complementary to the fastening means of the spigot and being of sufficient size and constructed and arranged to mount the spigot to the reservoir by the interaction between the fastening means of the spigot and of the filter receiving means, so that liquid to be dispensed from said spigot passes through a filter element mounted in said filter receiving means; and a filter element having a complementary configuration to that of the opening of the filter receiving means, said filter receiving means and filter element being constructed and arranged so that the filter element can be push-fitted into the filter receiving means.

2. The apparatus of claim 1 which further comprises means for holding said filter receiving means and said filter element snugly together in response to insertion of said filter element into said filter receiving means.

3. The apparatus of claim 2 in which holding means comprises a taper formed in at least one of the complementary mating surfaces of the filter receiving means and the filter element.

4. The apparatus of claim 1 in which said filter element comprises a hollow shell, end plates enclosing the longitudinal ends of said hollow shell, means forming a plurality of apertures in each of the end plates, and filter material carried in the chamber defined by the hollow shell and end plates.

5. The apparatus of claim 4 in which the filter material comprises filter paper adjacent to the inside face of each apertured end plate and activated charcoal disposed between the end plates.

6. The apparatus of claim 4 in which the shell and one of the end plates are formed in one piece.

7. The apparatus of claim 5 in which the apertures in the end plates comprise many relatively small apertures arrayed in a mesh pattern.

8. The apparatus of claim 1 in which the fastenings means on the spigot hollow member are external threads and the fastening means on the filter receiving means is a complementary threaded aperture and is constructed and arranged to cooperate with the spigot to mount the spigot to the reservoir.

9. The apparatus of claim 8 in which the filter receiving means has a cup-shaped configuration and in which the fastening means comprises threaded fastening means at the closed end of the cup.

* * * * *